(12) United States Patent
Liljedahl et al.

(10) Patent No.: US 10,089,339 B2
(45) Date of Patent: Oct. 2, 2018

(54) DATAGRAM REASSEMBLY

(71) Applicant: ARM LIMITED, Cambridge (GB)

(72) Inventors: Eric Ola Harald Liljedahl, Stockholm (SE); Mario Torrecillas Rodriguez, Cambridge (GB)

(73) Assignee: ARM Limited, Cambridge (GB)

( * ) Notice: Subject to any disclaimer, the term of this patent is extended or adjusted under 35 U.S.C. 154(b) by 256 days.

(21) Appl. No.: 15/212,442

(22) Filed: Jul. 18, 2016

(65) Prior Publication Data
US 2018/0018359 A1 Jan. 18, 2018

(51) Int. Cl.
G06F 17/30 (2006.01)

(52) U.S. Cl.
CPC .. G06F 17/30318 (2013.01); G06F 17/30371 (2013.01)

(58) Field of Classification Search
CPC ............... G06F 17/30318; G06F 17/30371
USPC ......................................................... 707/812
See application file for complete search history.

(56) References Cited

U.S. PATENT DOCUMENTS

| | | | | |
|---|---|---|---|---|
| 5,724,599 A * | 3/1998 | Balmer | ............ | G06F 15/16 710/260 |
| 5,974,518 A * | 10/1999 | Nogradi | ............ | H04L 49/90 709/236 |
| 6,026,093 A * | 2/2000 | Bellaton | ............ | H04L 47/62 370/412 |
| 6,157,955 A * | 12/2000 | Narad | ............ | H04L 45/16 709/228 |
| 6,243,720 B1 * | 6/2001 | Munter | ............ | H04L 29/12009 707/741 |

(Continued)

OTHER PUBLICATIONS

Clark, D.D., "IP Datagram Reassembly Algorithms", RFC Editor, United States, RFC 815, Jul. 1982, 9 pages. (Year: 1982).*

(Continued)

*Primary Examiner* — Phuong Thao Cao
(74) *Attorney, Agent, or Firm* — Nixon & Vanderhye P.C.

(57) ABSTRACT

Apparatus and a corresponding method for processing received datagram fragments are provided. Fragments are considered in fragments lists, which comprise a linked list of fragments. The fragments lists are referenced by corresponding entries stored in fragment list storage, where all received fragments from a given datagram will form part of the same fragment list, but a given fragment list can comprise fragments from multiple datagrams. An accumulated size of the payloads for a linked list of fragments is maintained and allows a determination to be made of whether it appears that sufficient fragments have been received that reassembly of a datagram may be possible. Access to a selected fragment list entry is made atomically, wherein the existing entry is first read and then if a datagram reassembly is to be attempted a write access sets the selected fragment list entry to a null entry before that datagram reassembly is attempted. If no reassembly is to be attempted the write access comprises updating the selected fragment list entry to include the received fragment in the linked list of fragments. A lock-free mechanism for access to the fragment list storage is thus provided and contention between parallel accesses is nonetheless limited, promoting the scaling of fragment reception processing to multiple parallel processes.

20 Claims, 8 Drawing Sheets

(56) References Cited

U.S. PATENT DOCUMENTS

| | | | | |
|---|---|---|---|---|
| 6,356,951 B1* | 3/2002 | Gentry, Jr. | H04L 69/22 | 709/217 |
| 6,389,468 B1* | 5/2002 | Muller | H04L 67/1002 | 709/226 |
| 6,434,620 B1* | 8/2002 | Boucher | H04L 29/06 | 709/230 |
| 6,453,360 B1* | 9/2002 | Muller | H04L 29/06 | 370/235 |
| 6,473,425 B1* | 10/2002 | Bellaton | H04L 29/06 | 370/392 |
| 6,480,489 B1* | 11/2002 | Muller | H04L 49/90 | 370/389 |
| 6,483,804 B1* | 11/2002 | Muller | H04L 49/602 | 370/230 |
| 6,606,301 B1* | 8/2003 | Muller | H04L 47/10 | 370/230 |
| 6,631,478 B1* | 10/2003 | Wang | G06F 11/1471 | 714/15 |
| 6,636,859 B2* | 10/2003 | Banerjee | H04L 47/10 | |
| 6,650,640 B1* | 11/2003 | Muller | H04L 49/602 | 370/392 |
| 6,781,992 B1* | 8/2004 | Rana | H04L 47/10 | 370/394 |
| 7,092,393 B1* | 8/2006 | Westbrook | H04L 49/3072 | 370/373 |
| 7,263,528 B2* | 8/2007 | Haff | H04L 29/06 | 707/622 |
| 7,346,059 B1* | 3/2008 | Garner | H04L 12/4625 | 370/235 |
| 7,372,864 B1* | 5/2008 | Reast | H04L 47/10 | 370/428 |
| 7,403,542 B1* | 7/2008 | Thompson | H04L 69/16 | 370/389 |
| 7,627,870 B1* | 12/2009 | Michaeli | H04L 49/9036 | 370/394 |
| 7,760,737 B2* | 7/2010 | Rana | H04L 47/10 | 370/394 |
| 7,797,352 B1* | 9/2010 | Hopwood | G06F 21/10 | 707/804 |
| 8,064,483 B2* | 11/2011 | Ooshima | H04L 69/166 | 370/394 |
| 8,255,567 B2* | 8/2012 | Mizrachi | H04L 47/34 | 709/201 |
| 9,141,554 B1 | 9/2015 | Candelaria | G06F 12/0864 | |
| 2002/0147722 A1* | 10/2002 | Banerjee | H04L 47/10 | |
| 2003/0039249 A1* | 2/2003 | Basso | H04L 49/25 | 370/394 |
| 2003/0056009 A1* | 3/2003 | Mizrachi | H04L 47/34 | 709/245 |
| 2003/0084038 A1* | 5/2003 | Balogh | G06F 9/505 | |
| 2004/0078480 A1* | 4/2004 | Boucher | H04L 29/06 | 709/237 |
| 2004/0158640 A1* | 8/2004 | Philbrick | H04L 29/06 | 709/230 |
| 2004/0177106 A1* | 9/2004 | Rose | H04L 63/0236 | 709/200 |
| 2005/0144415 A1* | 6/2005 | Doshi | G06F 9/5016 | 711/173 |
| 2005/0171937 A1* | 8/2005 | Hughes | G06F 17/30949 | |
| 2005/0286517 A1* | 12/2005 | Babbar | H04L 45/00 | 370/389 |
| 2006/0146362 A1* | 7/2006 | Romney | G06F 3/1206 | 358/1.15 |
| 2007/0237157 A1* | 10/2007 | Frank | H04L 1/0079 | 370/395.52 |
| 2007/0291662 A1* | 12/2007 | Mangin | H04L 63/1441 | 370/252 |
| 2009/0285238 A1* | 11/2009 | Shiraishi | H04L 49/90 | 370/474 |
| 2009/0316698 A1* | 12/2009 | Menten | H04L 47/10 | 370/392 |
| 2010/0008380 A1* | 1/2010 | Ooshima | H04L 69/16 | 370/474 |
| 2010/0014542 A1* | 1/2010 | Ooshima | H04L 49/90 | 370/474 |
| 2010/0082919 A1* | 4/2010 | Chen | G06F 3/0613 | 711/161 |
| 2010/0296518 A1* | 11/2010 | Cardona | H04L 49/90 | 370/412 |
| 2010/0332952 A1* | 12/2010 | Chung | G06F 11/1068 | 714/773 |
| 2011/0125749 A1* | 5/2011 | Wood | H04L 43/026 | 707/737 |
| 2012/0233222 A1* | 9/2012 | Roesch | H04L 63/1408 | 707/812 |
| 2014/0143264 A1* | 5/2014 | Runcie | G06F 11/3438 | 707/758 |
| 2014/0160935 A1* | 6/2014 | Zecharia | H04L 47/34 | 370/235 |
| 2015/0206596 A1* | 7/2015 | Baverstock | H04N 19/423 | 711/110 |
| 2015/0222562 A1* | 8/2015 | Ashokan | H04L 69/22 | 370/412 |
| 2015/0294002 A1* | 10/2015 | Corbett | G06F 17/30442 | 707/693 |
| 2015/0310661 A1* | 10/2015 | Tokuyoshi | G06T 15/50 | 345/426 |
| 2016/0182303 A1* | 6/2016 | Baba | H04L 67/12 | 370/351 |
| 2018/0004598 A1* | 1/2018 | Jensen | G06F 11/1068 | |
| 2018/0018359 A1* | 1/2018 | Liljedahl | G06F 17/30371 | |

OTHER PUBLICATIONS

Partridge, C., "Authentication for Fragments", In Proceedings of ACM SIGCOMM Hotnets-IV Workshop, 2005, 6 pages. (Year: 2005).*

Rescorla et al., "Datagram Transport Layer Security Version 1.2", Standards Track, RFC 6347, Jan. 2012, 32 pages. (Year: 2012).*

Shannon et al., "Beyond Folklore: Observations on Fragmented Traffic", IEEE/ACM Transactions on Networking, vol. 10, No. 6, Dec. 2002, pp. 709-720. (Year: 2002).*

* cited by examiner

DATAGRAM REASSEMBLY

TECHNICAL FIELD

The present disclosure relates to the reception of data packets. More particularly, it relates to the reassembly of datagrams where a given datagram is received as more than one fragment.

BACKGROUND

Due to the limitations of the underlying link over which it is transmitted, a long datagram may need to be split into multiple smaller fragments for transmission. These fragments are then transmitted independently and the fragments must be reassembled into the original datagram before further processing of that original datagram can take place. Carrying out this reassembly processing in a parallelized fashion enables a large number of fragments to be handled at the receiver, but brings the need for synchronisation between the processing elements performing the parallelized reassembly to reduce contention and therefore allow efficient scaling of the processing to such a parallelized environment.

SUMMARY

At least one example described herein provides apparatus comprising: reception circuitry to receive a datagram, wherein the datagram is received subdivided into multiple fragments; fragment list storage circuitry to store fragment list entries, wherein a fragment list entry comprises a pointer to a linked list of fragments and an accumulated size for the linked list of fragments; and fragment processing circuitry to perform an atomic access to a selected fragment list entry in response to reception of a fragment, wherein the selected fragment list entry is selected in dependence on at least one datagram identifier in the fragment, wherein the atomic access comprises a read access followed by a write access, and to calculate an updated accumulated size as the accumulated size plus a size of the fragment, wherein the fragment processing circuitry is responsive to completion of the read access to perform the write access to the selected fragment list entry, wherein, when the selected fragment list entry comprises a size of the datagram and the updated accumulated size is at least equal to the size of the datagram, the write access comprises setting the selected fragment list entry to a null entry and when the write access is complete the fragment processing circuitry attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

At least one example described herein provides a method of processing a datagram received subdivided into multiple fragments, the method comprising the steps of: storing fragment list entries, wherein a fragment list entry comprises a pointer to a linked list of fragments and an accumulated size for the linked list of fragments; performing an atomic access to a selected fragment list entry in response to reception of a fragment, wherein the selected fragment list entry is selected in dependence on at least one datagram identifier in the fragment, wherein the atomic access comprises a read access followed by a write access; calculating an updated accumulated size as the accumulated size plus a size of the fragment; and on completion of the read access, performing the write access to the selected fragment list entry, wherein, when the selected fragment list entry comprises a size of the datagram and the updated accumulated size is at least equal to the size of the datagram, the write access comprises setting the selected fragment list entry to a null entry and, when the write access is complete, attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

At least one example described herein provides apparatus comprising: means for receiving a datagram, wherein the datagram is received subdivided into multiple fragments; means for storing fragment list entries, wherein a fragment list entry comprises a pointer to a linked list of fragments and an accumulated size for the linked list of fragments; and means for processing fragments to perform an atomic access to a selected fragment list entry in response to reception of a fragment, wherein the selected fragment list entry is selected in dependence on at least one datagram identifier in the fragment, wherein the atomic access comprises a read access followed by a write access; means for calculating an updated accumulated size as the accumulated size plus a size of the fragment, wherein the means for processing fragments is responsive to completion of the read access to perform the write access to the selected fragment list entry, wherein, when the selected fragment list entry comprises a size of the datagram and the updated accumulated size is at least equal to the size of the datagram, the write access comprises setting the selected fragment list entry to a null entry and when the write access is complete the means for processing fragments attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1A:
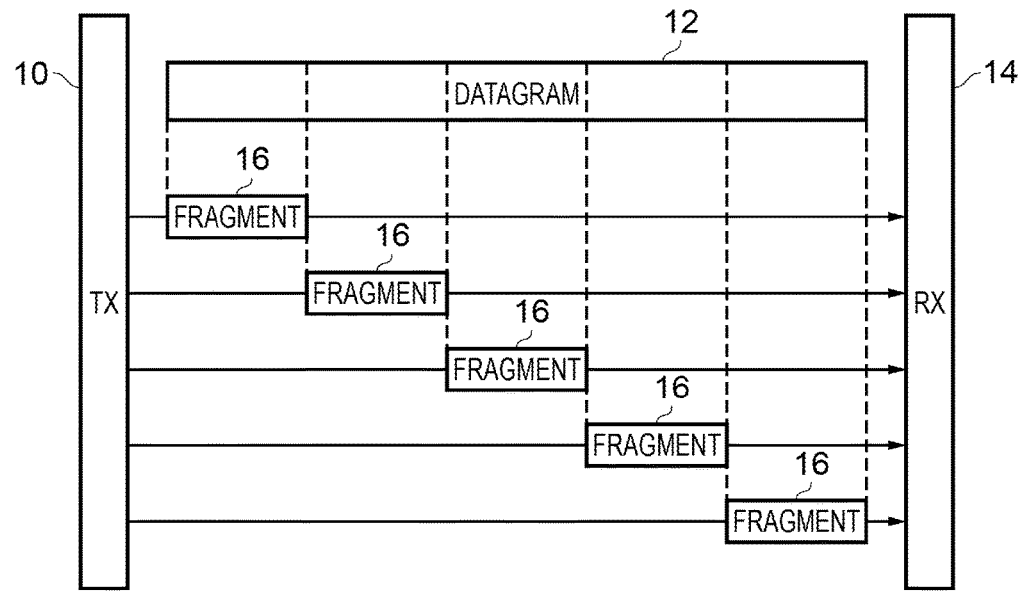
FIG. 1A schematically illustrates a datagram divided into multiple fragments being transmitted from a transmitter to a receiver.

In some example embodiments there is an apparatus comprising: reception circuitry to receive a datagram, wherein the datagram is received subdivided into multiple fragments; fragment list storage circuitry to store fragment list entries, wherein a fragment list entry comprises a pointer to a linked list of fragments and an accumulated size for the linked list of fragments; and fragment processing circuitry to perform an atomic access to a selected fragment list entry in response to reception of a fragment, wherein the selected fragment list entry is selected in dependence on at least one datagram identifier in the fragment, wherein the atomic access comprises a read access followed by a write access, and to calculate an updated accumulated size as the accumulated size plus a size of the fragment, wherein the fragment processing circuitry is responsive to completion of the read access to perform the write access to the selected fragment list entry, wherein, when the selected fragment list entry comprises a size of the datagram and the updated accumulated size is at least equal to the size of the datagram, the write access comprises setting the selected fragment list entry to a null entry and when the write access is complete the fragment processing circuitry attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

In handling the multiple fragments of datagrams which are received, the present techniques uses a processing framework within which two key concepts are defined. The first of these is the "fragment", where this term thus not only refers to the parts into which the datagram is subdivided, but also to an abstract object defined within the processing framework to represent one of those received parts. The second of these is the "fragment list" (also referred to herein as a "fraglist"), which is an abstract object defined within the processing framework to represent a linked list of fragments. It should be understood in this context that the "list" nature of this object represents the possibility for more than one fragment to be linked together, but does not imply any lower limit on the number of fragments in a fragment list, which therefore may even comprise no fragments (the "null fraglist") or just one fragment (not yet linked to any other fragments). Further, the present techniques provide the reception apparatus with fragment list storage circuitry, in which an array of entries stores fragment list entries, wherein each can point to a linked list of fragments.

Accesses made to the array only access a single entry which is identified in dependence on at least one datagram identifier in a fragment, for example such as an IP source address, an IP destination address, an IP protocol, an ID, and so on. The indexing into the array is defined such that a given key (i.e. set of datagram identifiers) maps to only one position in the array (also referred to herein as the "fraglist table"). When a fragment is processed and access to the array is made, a fraglist corresponding to the fragment is added to a fraglist read from the identified entry in the array. The resulting fraglist (from the addition (merging) of the two input fraglists) may then be written back to the selected entry in the array, or a reassembly of the fragments of the fraglist may be attempted. Whether to attempt the reassembly or to write the fraglist back to the array is determined on the basis of whether the fraglist "seems complete", in the sense that the fraglist seems to comprise a set of fragments which have the potential to be reassembled into a complete datagram. This determination is made with reference to an accumulated size of the linked list of fragments, wherein "size" here refers to the length of the payload of each fragment. Hence, when the size of the original datagram is known (which may for example be determined from knowing that a given received fragment is the last fragment of a datagram, and then calculating the datagram size as the offset of the fragment into the datagram plus the fragment length), if the accumulated size of the linked list of fragments is at least the datagram size then it is determined that the fragment list does indeed "seem complete".

The present techniques therefore propose a manner of processing fragments with reference to the fragment list array according to which the processing associated with the atomic access (which needs to be atomic to avoid conflict between separate accesses) to the array is very limited and the possibility for contention between accesses to the array is low. Specifically, the calculation of the updated accumulated size and the determination of whether the resulting fragment list "seems complete" can be computed in constant time, only accessing the data in the entry itself (and not for example traversing a linked list of fragments of arbitrary length). This approach means that the processing associated with the atomic access, which represents a "critical region" with regard to the overall processing of a fragment in terms of the possibility for contention between accesses, therefore does not comprise any processing of arbitrary duration. Most notably the reassembly of fragments into a datagram is not attempted in this critical region. As such the present techniques therefore provide an approach to the use of the fraglist array which can dispense with the use of locks, and parallelisation of the processing of received fragments is thus supported.

As mentioned above, the size of the datagram to which a given received fragment belongs may not, at least initially, be known. This may for example be due to the fact that the length (size) of the fragment itself (i.e. of its payload) is known, as well as the offset of the fragment into the datagram, but unless this fragment (or a previously received fragment from this datagram) is known to be the last fragment in the datagram, then the size of the datagram remains unknown. Conversely once the last fragment in a datagram has been received, the size of the datagram can be determined as the offset of this last fragment into the datagram plus the length of the last fragment. In this context, in some embodiments, when the selected fragment list entry comprises the size of the datagram and the selected fragment list entry comprises a last fragment in the datagram, the size of the datagram is set in the selected fragment list entry as an offset of the last fragment into the datagram plus a length of the last fragment, and when the selected fragment list entry does not comprise the size of the datagram, the size of the datagram is set in the selected fragment list entry as a predetermined value which is at least a maximum possible size for the datagram. The setting of the size of the datagram in the selected fragment list entry as this predetermined value which is at least the maximum possible size of the datagram enables an efficient processing of a subsequently determined updated accumulated size to be made. This is due to the fact that whilst the size of the datagram is unknown it is represented by (at least) the maximum possible size of the datagram and therefore the updated accumulated size will always be insufficient to result in a determination that the updated fragment list entry "seems complete".

Generating a combined fragment list and updating the selected fragment list entry may take a variety of forms, but in some embodiments the fragment processing circuitry is responsive to completion of the read access to perform a fragment list addition process prior to the write access to construct a combined fragment list from the fragment and the selected fragment list entry read by the read access, and wherein updating the selected fragment list entry to include the fragment in the linked list of fragments comprises writing a revised pointer to the combined fragment list. Accordingly little processing and manipulation of stored items is required, by virtue of the updating of a pointer, rather than of those stored items themselves. Similarly, updating the selected fragment list entry to include the fragment in the linked list of fragments may comprise writing the updated accumulated size in the selected fragment list entry.

The addition of two fraglists may take a variety of forms, but in some embodiments the fragment processing circuitry is responsive to completion of the read access to perform a fragment list addition process prior to the write access to construct a combined fragment list from the fragment and the selected fragment list entry read by the read access, wherein the fragment list addition process comprises a saturating addition to generate the updated accumulated size, wherein the saturating addition saturates at a predetermined value which is at least a maximum possible size for the datagram. Implementing this addition of sizes as a saturating addition limits the number of bits which are required for the result and therefore supports an efficient implementation of the present techniques.

In the context of an implementation in which, when the selected fragment list entry does not comprise the size of the datagram, the size of the datagram is set in the selected fragment list entry as a predetermined value which is at least a maximum possible size for the datagram, an efficient implementation may be provided by embodiments in which the fragment processing circuitry is responsive to completion of the read access to perform a fragment list addition process prior to the write access to construct a combined fragment list from the fragment and the selected fragment list entry read by the read access, wherein the fragment list addition process comprises a minimum comparison to generate the size of the datagram for the combined fragment list as a smaller value of the size of the datagram in the fragment and the size of the datagram in the selected fragment list entry. Accordingly, if the fragment is a last fragment in the datagram then the size of the datagram for the combined fragment list will then be equal to the expected total size of the reassembled fragments in that datagram.

As mentioned above efficiency may be gained in the implementation of the present techniques through the manipulation of pointers, rather than the stored data items to which those pointers refer. A further example of this arises in some embodiments in which the fragment processing circuitry is responsive to completion of the read access to perform a fragment list addition process prior to the write access to construct a combined fragment list from the fragment and the selected fragment list entry read by the read access, wherein the fragment list addition process comprises constructing a pointer to a last fragment in a first-ordered operand specified for the fragment list addition, wherein constructing the pointer is performed before commencing the read access. The construction of this pointer to the last fragment (which in some embodiments described herein is performed by a function named LastFrag) can therefore be carried out before the processing enters the above-mentioned "critical region", which begins with the read access, and the processing which takes place within the critical region is therefore kept limited.

In this context, efficient pointer-based processing is further supported by some embodiments in which the fragment list addition process comprises setting a further pointer in the last fragment in the first-ordered operand to indicate a first fragment in a second-ordered operand specified for the fragment list addition. This therefore allows for an efficient merging of the fraglist operands by setting the pointer in the last fragment of the first to indicate to the first fragment in the second.

The datagram reassembly process may take a variety of forms, but in some embodiments the datagram reassembly process further comprises a further write access to the selected fragment list entry to update the selected fragment list entry to comprise a revised pointer to an addition result of the selected fragment list entry and a remainder linked list of fragments which the datagram reassembly process has not reassembled into a complete datagram. Accordingly the present techniques recognise that even if the attempted reassembly process does result in the reassembly of a complete datagram from the linked list of fragments, further fragments may nevertheless remain after that reassembly process which do not form part of that datagram. This is due to the fact that the finite size of the fragment list array means that although a specific key for a fragment will map only to one position in the array, potentially many keys can map to the same position, and therefore any given fragment list entry may comprise fragments coming from multiple different datagrams. Writing the remainder linked list of fragments back to the selected fragment list entry thus enables these fragments to be correctly held for further processing as other fragments from the same datagram arrive, and for a subsequent reassembly process to attempt to reassemble another datagram constructed from these fragments.

The fragment list array may take a variety of forms, but in some embodiments the fragment list storage circuitry is arranged to store the fragment list entries in a hash table, wherein an index into the hash table indicating the selected fragment list entry is generated as a hash of the at least one datagram identifier in the fragment.

The fragment list storage circuitry may take a range of forms depending on the particular implementation, but in some embodiments the fragment list storage circuitry is provided by a memory device and in some such embodiments memory space for the fragment list entries is statically allocated in the fragment list storage circuitry. This static allocation of the memory space for the fragment list entries is possible according to the present techniques due to the fact that the fragment list array (the "fraglist table") is provided in the above described well-defined and well-constrained manner, so that the memory space which it requires can also be well-defined in advance and therefore statically allocated, rather than needing to allow dynamic allocation of this memory space over the course of the lifetime of the fragment list array to allow for significant variation in the memory space it requires.

It is recognised by the present techniques that the fragmentation of multiple datagrams and the limitations of the link over which the fragments are transmitted can result in significant variation in the time taken for individual fragments to reach the receiver from the original transmitter. In consequence the present techniques further provide mechanisms for monitoring the age of received fragments, i.e. the time period which has elapsed since their arrival at the receiver without having been successfully reassembled into a datagram, and ultimately to discard a fragment which is determined on that basis to be "stale", i.e. for which that time period is determined to be too long. The most common cause of stale fragments is when one fragment of a datagram is dropped, preventing the successful reassembly of the datagram, and the remaining (received) fragments of the datagram will then become stale. Hence in some embodiments the fragment list entry comprises an earliest arrival time value which indicates an arrival time of an earliest arriving fragment in the linked list of fragments, and the fragment processing circuitry is arranged to periodically examine the earliest arrival time value of each of the fragment list entries stored in the fragment list storage circuitry and, when the earliest arrival time value is older than an earliest allowed arrival time value, to examine the fragments in the linked list of fragments, to discard any stale fragments which have the arrival time value which is older than the earliest allowed arrival time value, and to update the pointer in the fragment list entry to point to a revised linked list of remaining non-stale fragments. This enables the apparatus to make more efficient use of its inevitably limited storage capability, and to discard fragments for which it is determined that there is no realistic possibility of those fragments being successfully reassembled into a datagram, thus freeing up the storage space which they occupy.

Further, whilst the revised linked list may be generated in a number of ways, in some embodiments the generation of the revised linked list of remaining non-stale fragments comprises an addition operation on the remaining non-stale fragments. This enables the remaining non-stale fragments to be efficiently processed and written back to the array as a combined fraglist.

In some embodiments the fragment processing circuitry is responsive to the earliest arrival time value being older than the earliest allowed arrival time value to remove the fragment list entry from the fragment list storage circuitry before examining the fragments in the linked list of fragments, and after discarding any stale fragments which have the arrival time value which is older than the earliest allowed arrival time value to add the revised linked list of remaining non-stale fragments to the fragment list entry in the fragment list storage circuitry. This procedure of removing the fragment list entry from the array before examining it, discarding the stale fragments, and adding the fraglist of non-stale fragments back to the fragment list entry in the array further supports the approach of the present techniques to limit the possibility for contention between parallel accesses to the same entry in the array, since the processing of the entry takes place outside the above-mentioned "critical region" of access to the entry in the array, when the entry is only accessible to that access.

Various representations of the fraglist may be adopted in dependence on the particular requirements of a given implementation, but in some embodiments the fragment list entry has a size for which the fragment processing circuitry is capable of performing the read access in a single memory access operation and for which the fragment processing circuitry is capable of performing the write access in a single memory access operation. For example, in one particular embodiment a representation of the fraglist is adopted in which it is a quadruple having four variables, a 64-bit head pointer, a 16-bit accumulated fraglist size, a 16-bit datagram size indication, and a 32-bit earliest arrival time value. Consequently this means that the fraglist can be read and written atomically in a single memory access operation on common 64-bit architectures, i.e. those which allow such 128-bit atomic operations (e.g. using load/store exclusive or compare-and-exchange on an ARM architecture).

The above-mentioned parallelisation of the access to the fragment list array may be achieved in a number of ways, but in some embodiments the fragment processing circuitry is capable of executing multiple execution threads, wherein each execution thread of the multiple execution threads independently handles an allocated fragment of the multiple fragments. Alternatively or in addition in some embodiments the apparatus comprise multiple fragment processing circuitries, wherein each fragment processing circuitry of the multiple fragment processing circuitries independently handles an allocated fragment of the multiple fragments.

Further, in some embodiments the atomic access may be provided in a "far" implementation, allowing the operation to "skip" any cache levels solely associated with particular processing elements of the above-mentioned multiple fragment processing circuitries, and for the fragment list array to be stored in a storage level shared by the multiple fragment processing circuitries. Accordingly in some embodiments the apparatus further comprises: a private data store associated with each fragment processing circuitry; and a shared data store shared by the multiple fragment processing circuitries, and each fragment processing circuitry is responsive to presence in its private data store of a copy of the selected fragment list entry, and when another fragment processing circuitry seeks access to the selected entry, to cause the copy of the selected fragment to be sent to the shared data store, and to cause the atomic access to be exported to and carried out on the shared data store. This further supports the scalability to multiple processing elements and may for example be using the far atomic compare and swap operation provided in the ARM v8.1 architecture.

In some example embodiments there is a method of processing a datagram received subdivided into multiple fragments, the method comprising the steps of: storing fragment list entries, wherein a fragment list entry comprises a pointer to a linked list of fragments and an accumulated size for the linked list of fragments; performing an atomic access to a selected fragment list entry in response to reception of a fragment, wherein the selected fragment list entry is selected in dependence on at least one datagram identifier in the fragment, wherein the atomic access comprises a read access followed by a write access; calculating an updated accumulated size as the accumulated size plus a size of the fragment; and on completion of the read access, performing the write access to the selected fragment list entry, wherein, when the selected fragment list entry comprises a size of the datagram and the updated accumulated size is at least equal to the size of the datagram, the write access comprises setting the selected fragment list entry to a null entry and, when the write access is complete, attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

In some example embodiments there is an apparatus comprising: means for receiving a datagram, wherein the datagram is received subdivided into multiple fragments; means for storing fragment list entries, wherein a fragment list entry comprises a pointer to a linked list of fragments and an accumulated size for the linked list of fragments; and means for processing fragments to perform an atomic access to a selected fragment list entry in response to reception of a fragment, wherein the selected fragment list entry is selected in dependence on at least one datagram identifier in the fragment, wherein the atomic access comprises a read access followed by a write access; means for calculating an updated accumulated size as the accumulated size plus a size of the fragment, wherein the means for processing fragments is responsive to completion of the read access to perform the write access to the selected fragment list entry, wherein, when the selected fragment list entry comprises a size of the datagram and the updated accumulated size is at least equal to the size of the datagram, the write access comprises setting the selected fragment list entry to a null entry and when the write access is complete the means for processing fragments attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

Some particular embodiments will now be described with reference to the figures.

FIG. 1A schematically illustrates a transmitter 10 sending a datagram 12 to a receiver 14, wherein the datagram is subdivided into multiple fragments 16, in which form the datagram is in fact physically transmitted from transmitter 10 to receiver 14. This subdivision of the datagram into multiple fragments may itself take place in several stages, for example where a first transmission link connecting the transmitter to an intermediate node has a given size of its maximum transmission unit (MTU), and a second transmission link between the intermediate node and the receiver has a smaller MTU, requiring fragments created at the transmitter to be further fragmented for transmission via the second transmission link. It will be understood that the representation in FIG. 1A is a simplification for clarity, and the fact that each fragment will have a modified copy of the header of the complete datagram is not explicitly shown, for example. One of ordinary skill in the art knows about such fragmentation, and further discussion thereof is omitted here merely for the purpose of brevity.

A receiver which receives multiple fragments of one or more datagrams must therefore be provided with the capability to reassemble those multiple fragments into datagrams, such that the original one or more datagrams can be reconstructed. Contemporary datagram sizes and transmission link limitations can mean that datagram reassembly is a significant processing burden for the receiver. For this reason the present techniques seek to provide an approach which may easily be adopted by multiple processing elements carrying that processing burden in parallel.

Figure 1B:
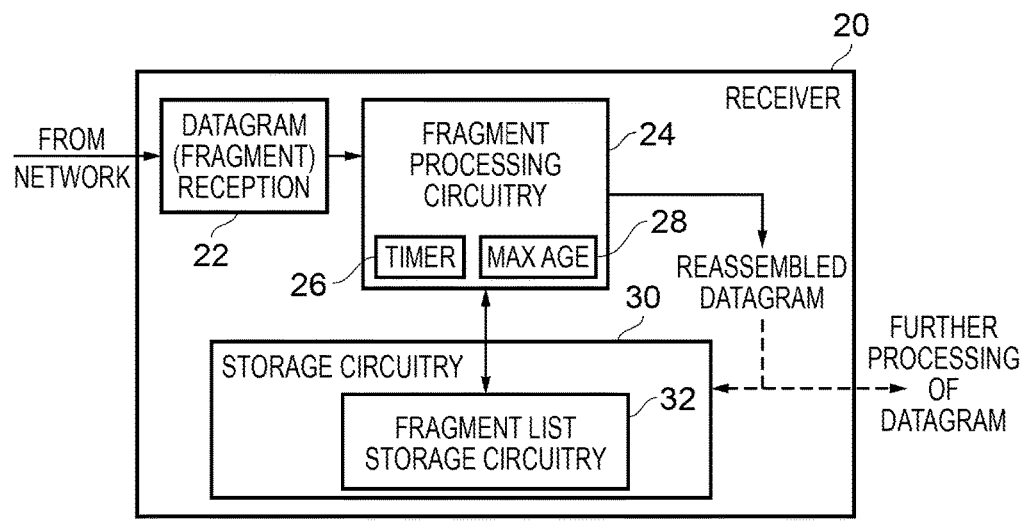
FIG. 1B schematically illustrates a receiver apparatus in one embodiment.

The general structure of a receiver according to the present techniques is schematically illustrated in one embodiment in FIG. 1B. The receiver 20 receives datagram fragments from a network at its reception circuitry 22, and a received fragment is then passed on to its fragment processing circuitry 24. FIG. 1B shows the fragment processing circuitry 24 as comprising a timer 26 and a maximum age storage 28, by means of which the fragment processing circuitry 24 can determine whether selected fragments are too old for further processing (also referred to herein as being "stale"). This process is described in more detail below with reference to FIG. 8.

Storage of the received fragments takes place in the storage circuitry 30, which is also used by the fragment processing circuitry 24 to store an array of fragment list entries, as referenced by the fragment list storage circuitry 32 in FIG. 1B. As will be described in more detail with reference to the figures which follow, fragment processing circuitry 24 makes use of the fragment list array to gather the fragments in an efficient manner (from an administrative point of view) and to determine when sufficient fragments from a given datagram have been received such that a reassembly of those fragments into the original datagram can be attempted. A successfully reassembled datagram is then passed on by the receiver 24 for further processing by a further component of the system to which the receiver 20 belongs, which is not explicitly illustrated. One of ordinary skill in the art is familiar with the processing to which such a received datagram may be subjected, and further description thereof is omitted here merely for the purpose of brevity. As will also be described in more detail below when reassembly of a datagram is attempted, whether or not one or more datagrams are successfully reassembled this process may result in a number of non-reassembled fragments remaining, and the dashed arrow in FIG. 1B indicates that these are added back to the fragment list array, such that a later reassembly, when further fragments required to complete the relevant datagram have been received, may once again be attempted.

Figure 2:
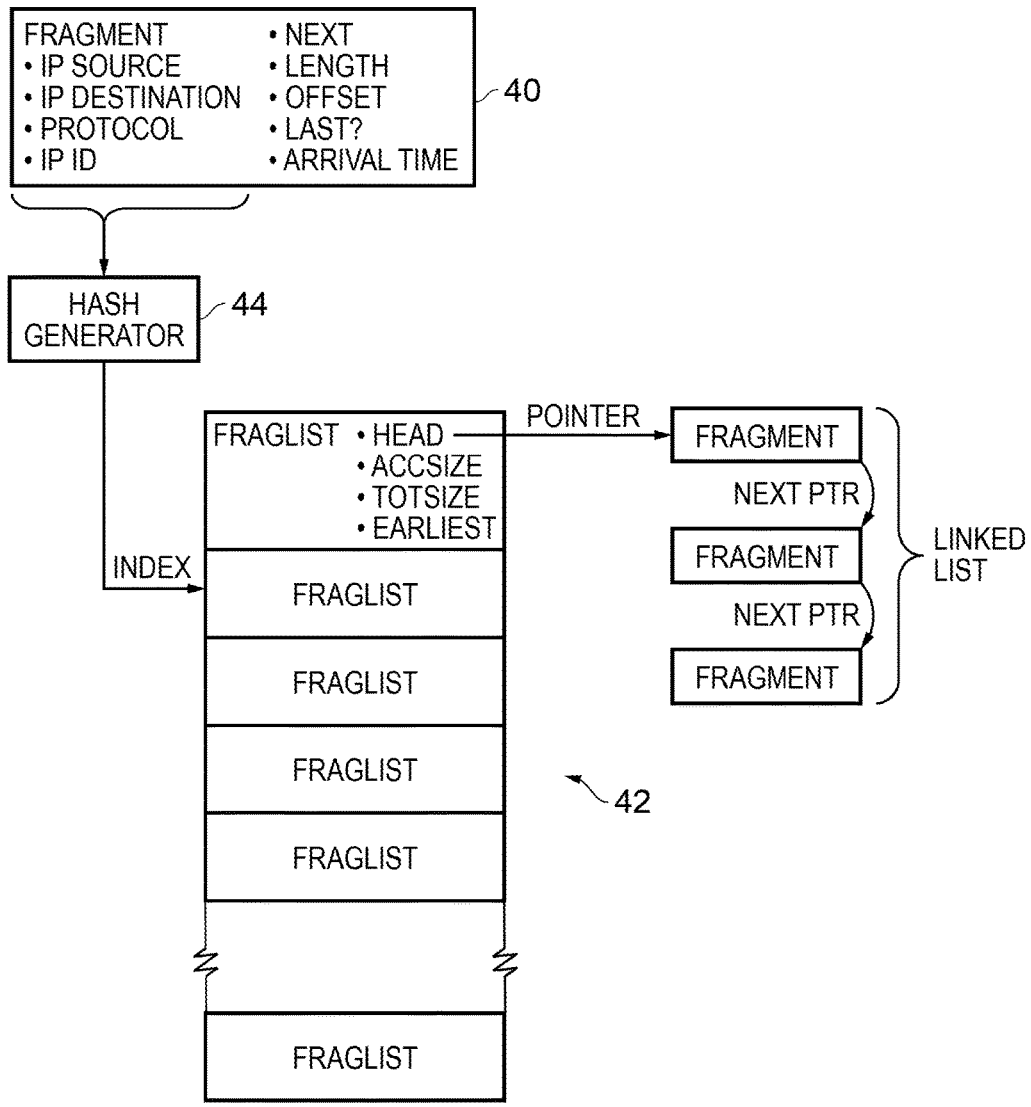
FIG. 2 shows a received fragment being used to index into an array of fragment list entries in fragment list storage in one embodiment.

FIG. 2 schematically illustrates a fragment 40 and a fragment list array 42, wherein a "fragment" here refers both to the complete portion of the datagram which is physically transmitted via the link as well as a directly corresponding processing object with defined properties for the purposes of the application of the present techniques. On the one hand the physical fragment itself has certain information associated with it and which can be read from its header, such as the IP source address, the IP destination address, the applicable protocol, and the IP ID, as shown in FIG. 2. On the other hand the fragment object according to the present techniques is constructed having the following (constant value) properties:

length (of the payload);
offset (into the original datagram);
last (indicating whether it is the last fragment of the original datagram); and
arrival time (at the receiver).

A fragment also has a (mutable) next pointer that can point to another fragment, and this forms the basis of a linked list of fragments, also referred to herein as a "fraglist". Conceptually the fraglist (fragment list) can be viewed as a monoid, satisfying the axioms of closure ($\forall a, b \in$ fraglist: $a \cdot b \in$ fraglist), associativity ($\forall a,b,c \in$ fraglist: $(a \cdot b) \cdot c = a \cdot (b \cdot c)$), and identity element ($\forall a \in$ fraglist: $\forall e \in$ fraglist: $e \cdot a = a \cdot e = a$). The group operator can be viewed as a form of addition and will be denoted herein as '+'. The fraglist concept also includes some other functions and predicates.

Specifically, a fraglist is, according to the present techniques, described with the following quadruple:

head: a pointer to the first fragment (in a linked list of fragments) or NULL;
accsize: an accumulated value of fragment lengths in the fragment list;
totsize: a size of the original datagram if known, otherwise MAXSIZE; and
earliest: an earliest arrival time of all fragments in fragment list, N/A for an empty list.

Note that MAXSIZE is the largest (accumulated and total) size that can be encoded and stored. MAXSIZE can also be viewed as representing an unknown size.

For a fraglist of one fragment the quadruple is derived as follows:

head points to the fragment itself;
accsize is the fragment length;
totsize is the fragment offset+fragment length, if the fragment is the last fragment, MAXSIZE otherwise; and
earliest is the fragment arrival time.
the fragment's next pointer is NULL.

Now considering FIG. 2 further, a hash generator 44 in the fragment processing circuitry (e.g. item 24 in FIG. 1) generates an index into the fragment list array (table) 42 on the basis of the IP source, IP destination, protocol, and IP ID information from the fragment, this combination of invention also been referred to as a key. The hash generator 44 further generates the index by using a hash of the key modulo the table (array) size. As will be described in more detail below the received fragment, in the form of a corresponding fraglist object, is then added to the fraglist in the entry indexed. FIG. 2 also schematically illustrates how the head pointer of a fraglist points to a linked list of fragments.

Figure 3B:
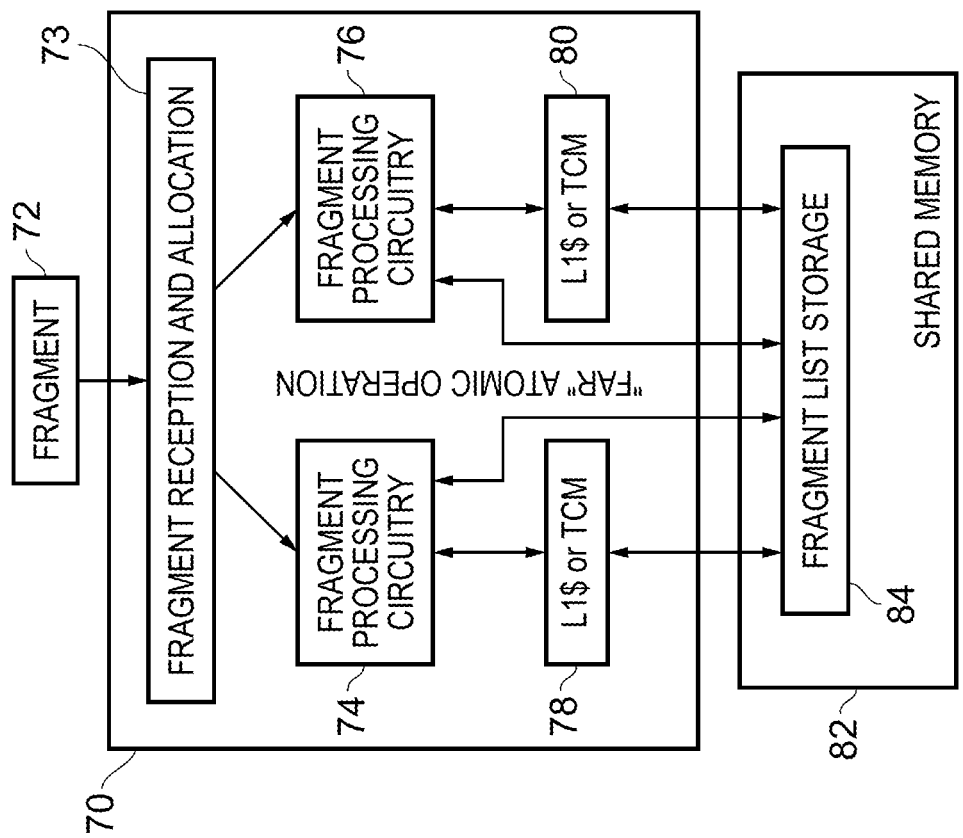
FIG. 3B schematically illustrates a receiver apparatus in one embodiment which comprises multiple fragment processing circuitries capable of operating in parallel.
Figure 3A:
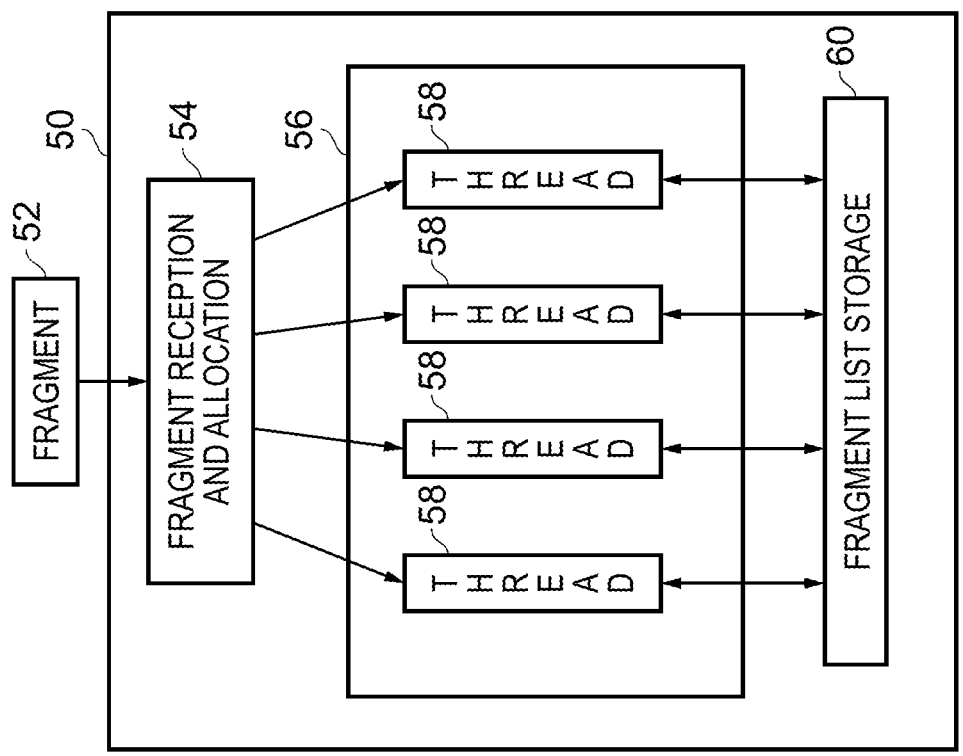
FIG. 3A schematically illustrates a receiver apparatus in one embodiment which is capable of executing multiple data processing threads in parallel.

Access to the fragment list table (array) 42 of FIG. 2 according to the present techniques requires on the one hand only an access to the selected indexed entry to be made and on the other hand enables that access to be kept brief. This means that the parallelisation of the access to the table is well supported, as the opportunity for contention between parallel processing elements seeking access to the same entry of the table to occur is correspondingly limited. FIGS. 3A and 3B schematically illustrate two example embodiments in which such parallelisation occurs. FIG. 3A shows an apparatus 50 which receives a transmitted fragment 52 by means of its fragment reception and allocation circuitry 54. This fragment 52 is then passed to the fragment processing circuitry 56, in which it has been allocated to one of the multiple processing threads 58 which the fragment processing circuitry 56 is capable of executing in parallel. One of ordinary skill in the art is familiar with the manner in which such parallel thread execution may be implemented and further discussion thereof is omitted here merely for the purpose of brevity. Each of the threads 58 makes access to the fragment list storage 60 which, in this example, forms part of the apparatus 50. Specifically, the thread of the threads 58 to which the fragment 52 is allocated accesses a selected entry in the fragment list table stored in fragment list storage 60 in order to add the fragment 52 thereto. FIG. 3B shows an apparatus 70 which receives a transmitted fragment 72 by means of its fragment reception and allocation circuitry 73. This fragment 72 is then passed to a selected one of the fragment processing circuitries 74, 76. The fragment processing circuitries 74, 76 each has an associated "private" storage device 78, 80 respectively. Each of the fragment processing circuitries 74, 76 makes access to the fragment list storage 84 within the shared memory 82. In the example of FIG. 3B the shared memory 82 is illustrated as being a separate component to the apparatus 70, but in a variant could be comprised within that apparatus. Analogously to the example of FIG. 3A, the fragment processing circuitry to which the fragment 72 is allocated accesses a selected entry in the fragment list table stored in fragment list storage 84 in order to add the fragment 72 thereto. A direct access to the shared memory can also be made by a "far" atomic operation, which skips the private storage 78, 80, and acts directly on the shared memory.

Figure 4A:
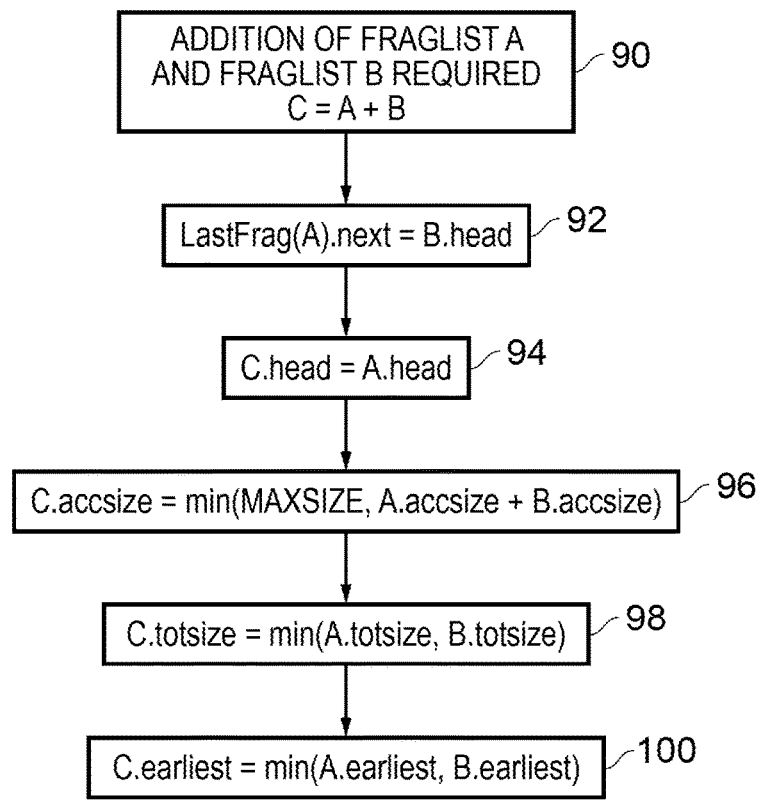
FIG. 4A shows a sequence of steps which are taken in one embodiment when performing an addition of two fragment lists.

The above-mentioned addition with respect to fraglists is defined according to the present techniques as a monoid operation which adds together (merges) two fraglists A and B into a combined fraglist C. The addition operation can be computed as follows (assuming A is not the null element, code can be written which handles the null case the same way as the non-null case), these steps also being shown in flow diagram form in FIG. 4A starting at step 90:

LastFrag(A).next=B.head [step 92];
C.head=A.head [step 94];
C.accsize=min(MAXSIZE, A.accsize+B.accsize) (a saturating add in order to limit the number of bits required for the result) [step 96];
C.totsize=min(A.totsize, B.totsize) (if a last fragment is added, totsize will then equal the expected total size of the reassembled fragments) [step 98]; and
C.earliest=min(A.earliest, B.earliest) [step 100];

The function LastFrag(F) returns a pointer to the last fragment in the linked list of fragments specified by F.head.

Figure 4B:
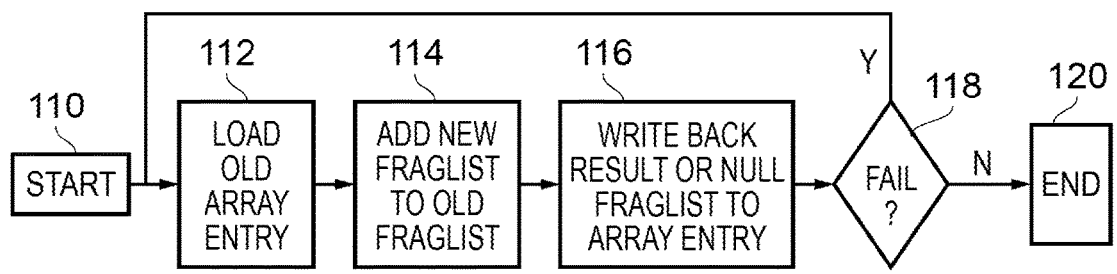
FIG. 4B shows a sequence of steps which are taken in one embodiment when adding a new fragment list to a old fragment list in an array of fragment list entries.

An overview of the process according to which a new fraglist is added to an existing fraglist is shown by the flow diagram of FIG. 4B. The process begins at step 100, whereafter at step 112 an array entry holding the existing fraglist is loaded (i.e. the array entry is atomically accessed, and the fraglist quadruple stored in that entry is retrieved for processing by the processing element performing this addition). At step 114 the new fraglist is added to the old fraglist, and at step 116 the processing element seeks to write back either the resulting fraglist or the null fraglist to the array entry, depending on whether the addition result appears to allow reassembly (i.e. it "seems complete" see below) or not. However, this write back will fail if the entry has changed (i.e. is no longer the null entry). The entry may have changed because another processing element may have accessed this entry and updated it in the interim. If the write back is determined to have failed (at step 118) then the flow returns to step 112 for the addition to be restarted. Otherwise the flow ends at step 120.

The present techniques further define a fraglist predicate SeemsComplete(F) which is true if the fraglist F seems to contain enough fragments to allow a successful reassembly operation, and otherwise is false. SeemsComplete is defined as:

SeemsComplete(F)=F.accsize≥F.totsize

SeemsComplete may return false positives when fragments from different datagrams exist in the same fraglist, which may occur because as noted above indexing into the fragment list table is such that although the given fragment only corresponds to a unique table entry, multiple fragments from different datagrams can index into the same table entry. Both the fraglist addition and SeemsComplete predicate can be computed in constant time only accessing the data in the fraglist. This is important for implementations using loadlink and store-conditional (LL/SC) operations or compare-and-swap (CAS) operations. LastFrag (which involves traversing a linked list) can be pre-computed before entering the critical region.

Additionally the present techniques provide a Reassemble (F) function that attempts to reassemble the fragments in fraglist F into one or more complete datagrams, returning a (variable size) tuple consisting of a fraglist with any remaining (non-reassembled) fragments, followed by a list with complete (reassembled) datagrams. As the Reassemble function is not evaluated in the critical region (as will be seen more clearly below), its design and implementation is mostly of no consequence to the lock-free algorithm. One minor exception is that the associativity axiom set out above for a fraglist provides an incomplete guarantee that regardless of the order in which fragments are processed, the resulting fraglist will be the same. This is due to the fact that fraglist addition is not commutative (a+b≠b+a, since the fraglist head pointer may be different). Instead the present techniques adopt a requirement that the Reassemble function returns the same value for a+b as for b+a, such that all sensitivity to fragment processing order is avoided:

∀a,b∈fraglist: Reassembly(a+b)=Reassembly(b+a).

Figure 5:
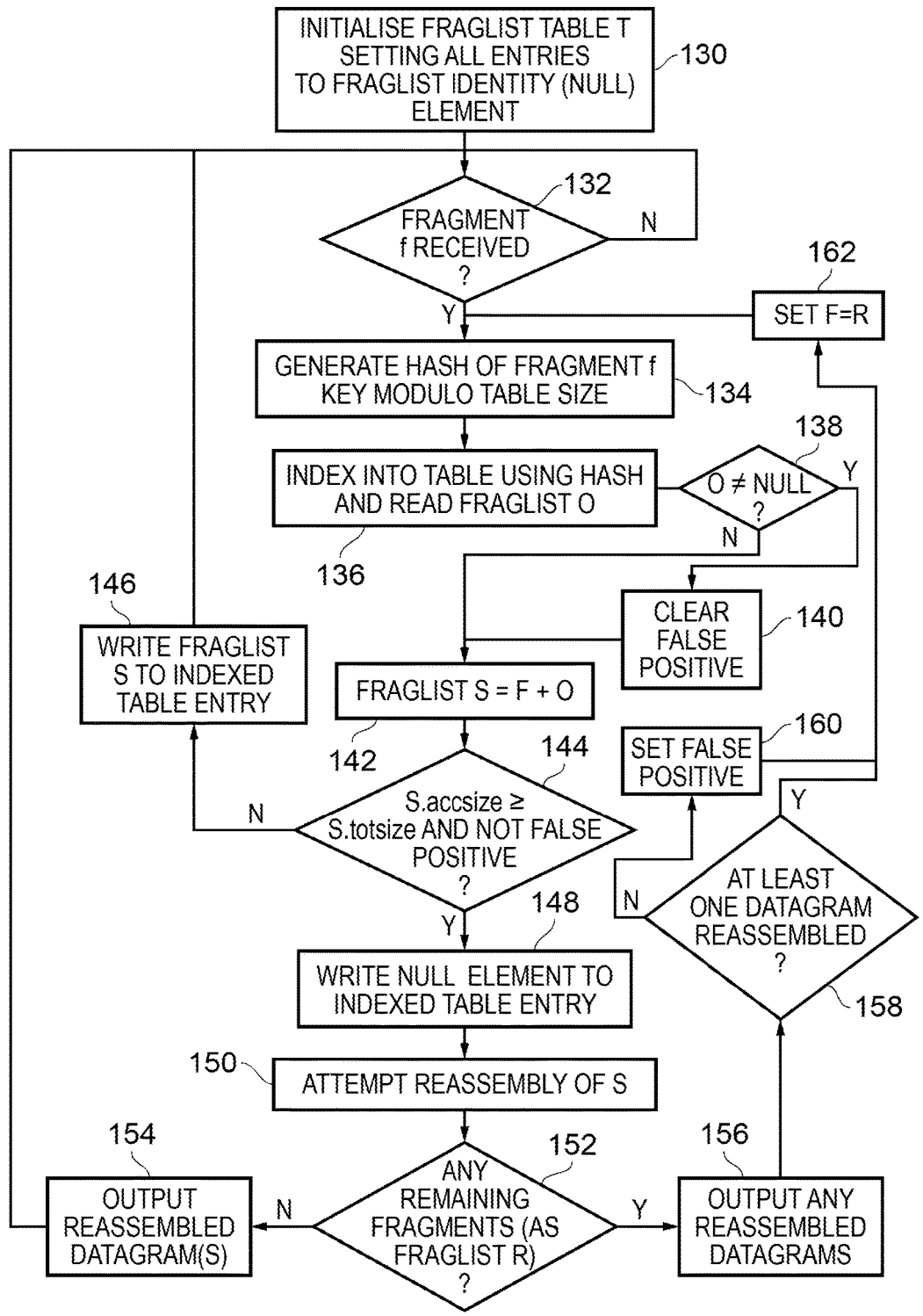
FIG. 5 shows a sequence of steps which are taken in the method of one embodiment to handle the reception of datagram fragments.

A description of the method of one embodiment of the present techniques is now made with reference to the flow diagram shown in FIG. 5. The flow begins at step 130 where a fraglist table T is initialised with all entries being set to the fraglist identity (null) element. The flow then waits at step 132 until a new fragment f is received. Thereafter at step 134 a specific key (in this example being IP source address, IP destination address, protocol, and ID) from the fragment f is used to generate an index into (or position in) the fraglist table by hashing the key modulo the table size. The table is then accessed at step 136 and the fraglist O stored at that entry read. Subsequently at step 138 if O is not the fraglist null element, then the flow proceeds via step 140 where a "false positive" flag is cleared. Otherwise the flow proceeds directly to step 142, where the fraglist S is created by the addition of F and O, where F is a fraglist generated corresponding to the fragment f. It is then determined at step 144 if the resulting fraglist S "seems complete". Specifically the determination carried out at this step is whether the accumulated value of the fragment lengths in fraglist S (accsize) is at least equal to the value held for totsize for S, recalling that totsize holds the value MAXSIZE unless the size of the original datagram is known. Additionally at step 144 it is checked if the false positive flag is not set. If either of these conditions fails then the flow proceeds via step 146, at which fraglist S is written back to the indexed table entry, and then to step 132 where the reception of a further fragment is awaited. If however it is determined at step 144 that fraglist S does indeed seem complete (and the false positive flag is not set), then the flow proceeds to step 148 where the null fraglist element is written to the indexed table entry and at step 150 reassembly is attempted on the fraglist S. Furthermore, note that if the write operation of either step 146 or step 148 fails, then the procedure in each case is rolled back to, and restarted at, step 136.

Thereafter at step 152 it is determined if following this reassembly there are any remaining fragments, represented as a fraglist R, which have not been successfully reassembled into a complete datagram. If this is not the case, i.e. all fragments in the fraglist S were successfully reassembled into one or more datagrams, then this datagram or these datagrams are output at step 154. The flow then returns to step 132. Conversely if it is found at step 152 that non-reassembled fragments exist then the flow proceeds to step 156 where any datagrams which have been successfully reassembled are output (where it should be recognised that it may be the case that no datagrams have been successfully reassembled at this iteration). Indeed, at the subsequent step 158, if no datagram has been reassembled, then the flow then proceeds via step 160 where the false positive flag is set. In other words, the provision of this mechanism recognises that the "seems complete" predicate can be true when the fraglist S comprises fragments from different datagrams, or when the fraglist contains whole or partial duplicate fragments for the same datagrams, but the fraglist S does not in fact yet comprise sufficient fragments from any individual datagram for successful reassembly of that datagram to be possible. This "false positive" satisfaction of the "seems complete" condition is therefore noted by the use of the false positive flag to prevent repeated unsuccessful reassembly attempts being made. Next, at step 162, the fraglist R (representing the remaining fragments) is set as the input fraglist F to the algorithm, and the flow continues with step 134. This enables these remaining fragments, represented as fraglist R, either to be written back into the table (at step 146) or, given that further fragments may have been received and stored in the table in the interim (clearing the positive flag at step 140) allowing a further reassembly to be attempted.

An example implementation of the algorithm to process a fragment f is set out below in C-like pseudo code:

```
process_fragment(fraglist table T, fragment f)
{
    int i = hash of f.key modulo table size;
    fraglist F = fraqlist corresponding to fragment f;
    bool false_positive = false;
    for(;;)
    {
restart:
        fraglist O = T[i]; // an atomic read of T[i] - the critical section starts here
        if (O != null)
```

-continued

```
    {
        false_positive = false;
    }
    fraglist S = F + O;
    if (!SeemsComplete(S) || false_positive)
    {
        T[i] = S; // a conditional atomic write to T[i] - the
        critical section ends here
        return;
    }
    T[i] = null; // a conditional atomic write to T[i] - the
critical section ends here
        fraglist R, D_0, D_1, ...;
        (R, D_0, D_1, ...) = Reassemble(S); // D_x are reassembled datagrams
        if (R == null)
        {
            return; // Where (D_0, D_1, ...) may for example be returned
        }
        false_positive = D_0 == null; // i.e. this flag is set as true if
        no reassembly was possible and thus even a first reassembled
        datagram D_0 has not been generated
        F = R;
    }
}
```

Note that if a conditional atomic write fails, then the operation is restarted at the "restart" label. Note also that if a suitable representation of the fraglist is chosen (e.g. where head is a 64-bit pointer, accsize and totsize are 16 bits each, and earliest is 32 bits), a fraglist can be read and written atomically (e.g. using load/store exclusive or compare-and-exchange) on common 64-bit architectures. In this context it is worth further noting that since no spatial or temporal locality is expected when accessing the fraglist table, the implementation of accesses to the fraglist table using a "far" operation, which causes a local storage (e.g. a private cache) to be skipped, further supports the scalability of the present techniques to multiple parallel processing elements. The ARMv8.1 far atomic compare-and-swap operation provides a suitable such operation. Finally, note with reference to the above description of FIG. 5, and also with reference to the above pseudo code, that there is no reassembly processing done in the "critical section", which could otherwise block other processing elements from progressing. Instead, the computation done in the critical section (e.g. fraglist addition and evaluating the SeemsComplete predicate) is short, deterministic and without global side effects. This supports successful use of the above-mentioned LL/SC or CAS operations. Multiple processing elements processing fragments belonging to the same datagram (or otherwise hashing to the same table position) will defer processing to one of the threads and then continue execution.

Figure 6:
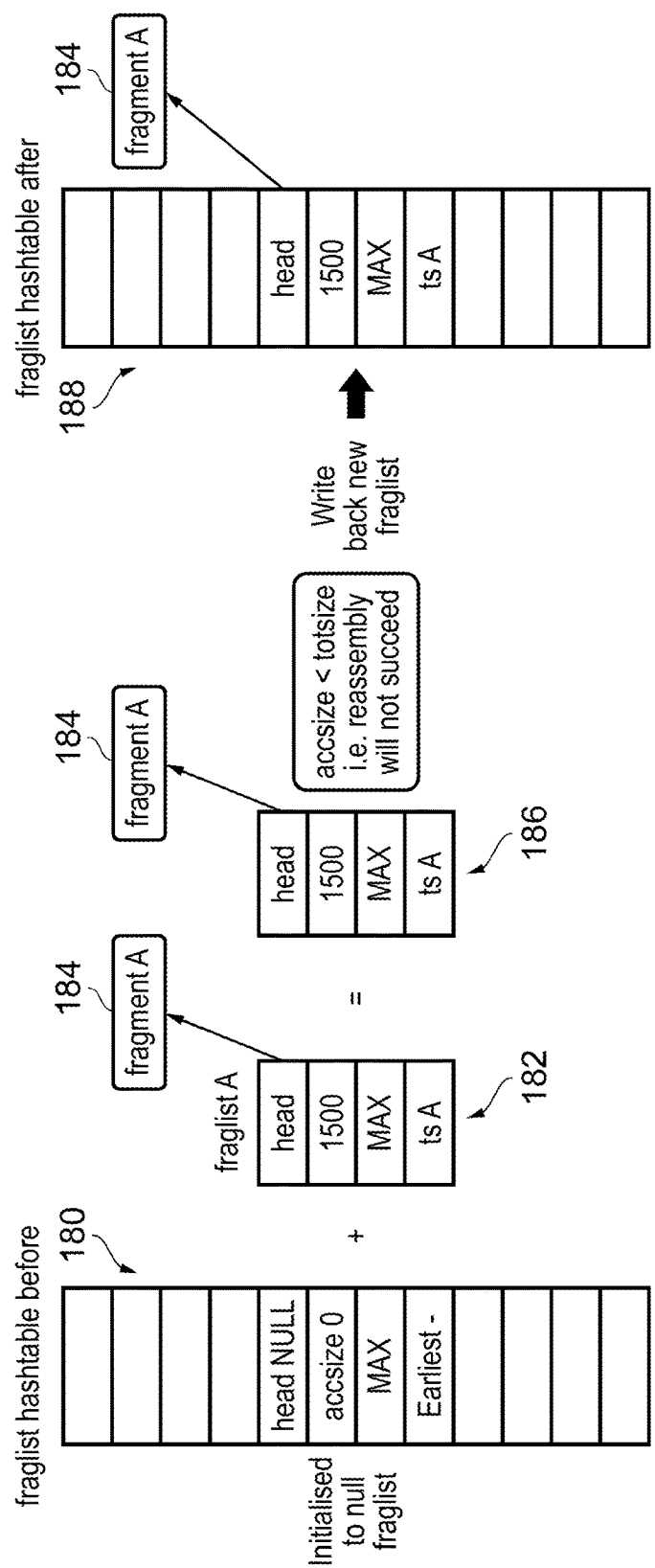
FIG. 6 shows one example of the updating of an entry of a fragment list array on reception of a first fragment.
Figure 7:
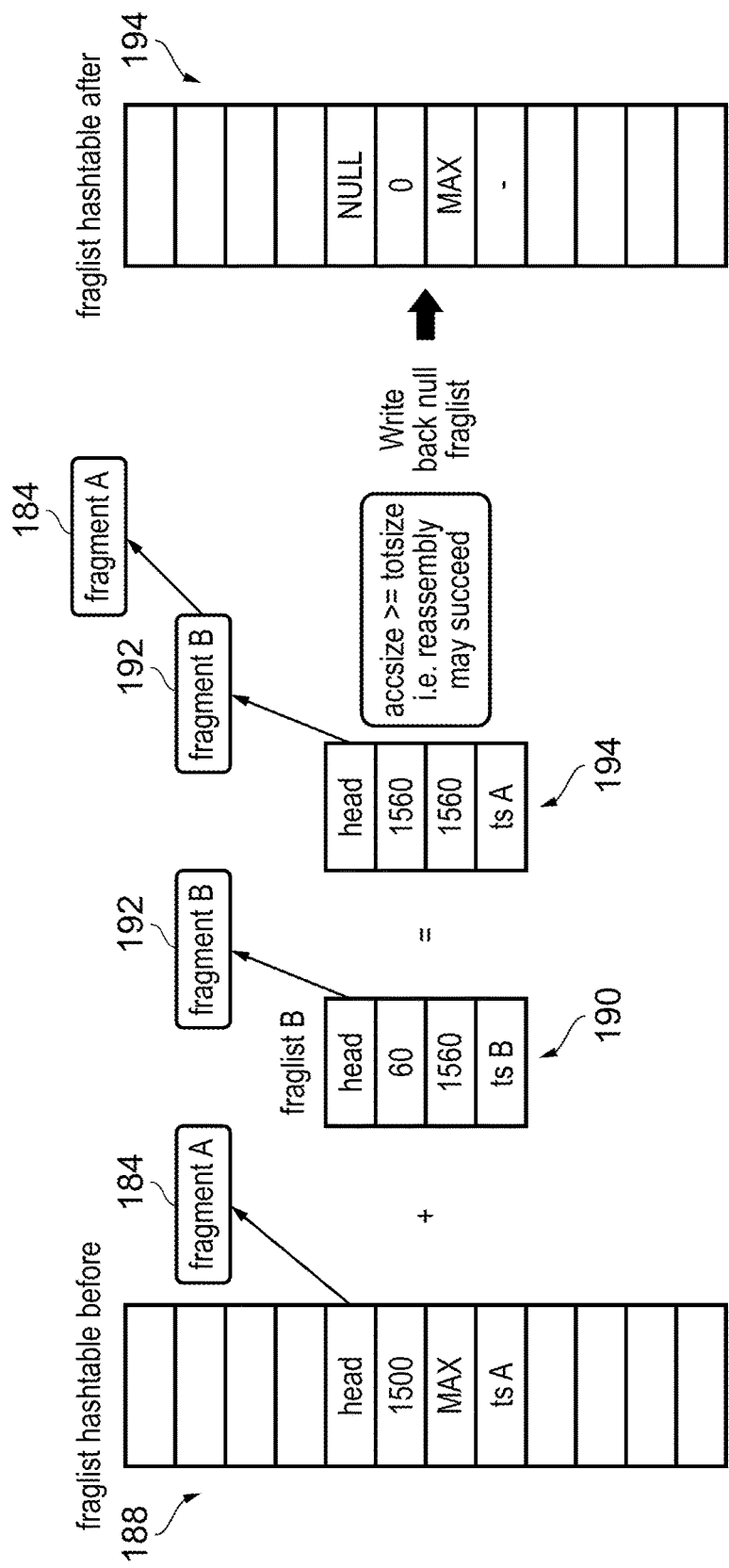
FIG. 7 shows one example of the updating of the entry of the fragment list array of FIG. 6 on reception of a second fragment.

An example of how a particular fraglist table entry is updated in one embodiment as a first fragment (A) and then a second fragment (B) is shown in FIGS. 6 and 7. Prior to the reception of fragment A the relevant fraglist table entry in the fraglist table 180 holds the null fraglist element, which comprises a null head pointer, a value of 0 for accsize and a value of MAX for totsize (where MAX is the largest value of accsize and totsize which can be encoded and stored). No value is set for the earliest arrival time. The fraglist A 182 is generated to correspond to the fragment A, with its head pointer then pointing to fragment A 184 itself. In this example fragment A has a payload length of 1500, so accsize is set to 1500. Fragment A is not indicated to be the last fragment of its original datagram, so totsize is set to MAX-SIZE. The arrival time stamp for A (ts A) is used to set the value of earliest. Consequently the addition of the null fraglist element in the relevant fraglist table entry and the fraglist A 182 results in a fraglist 186, which is identical to fraglist A. Comparison of accsize and totsize shows that accsize is less than totsize, so it is known that an attempted reassembly will not succeed and fraglist 186 is written back to the relevant fraglist table entry and the fraglist table 188 then contains a revised entry as shown.

Turning to FIG. 7, which begins with a representation of the fraglist table 188 with which FIG. 6 concluded, a further fragment B is received for which a fraglist B 190 is generated comprising a head pointer which points to the fragment B 192 itself. In this example fragment B has a payload length of 60, so accsize of fraglist B is set to 60. Fragment B is indicated to be the last fragment of its original datagram, so totsize is set to the offset of fragment B (in this case 1500) plus the length of fragment B (60), i.e. 1560. The arrival time stamp for B (ts B) is used to set the value of earliest. Consequently the addition of the fraglist in the relevant fraglist table entry and the fraglist B 190 results in a fraglist 194, in which the head pointer points to fragment B (and the head pointer of fragment B 192 has been modified to point to fragment A 184). Both accsize and totsize hold values of 1560, and the value of earliest is then ts A (fragment A having been the earlier arriving fragment). Now a comparison of accsize and totsize shows that accsize is equal to totsize, so a reassembly may succeed and the null fraglist element is written back to the relevant fraglist table entry and the fraglist table 194 then contains a revised entry as shown (which of course is the same as the original configuration shown in 180 of FIG. 6).

Figure 8:
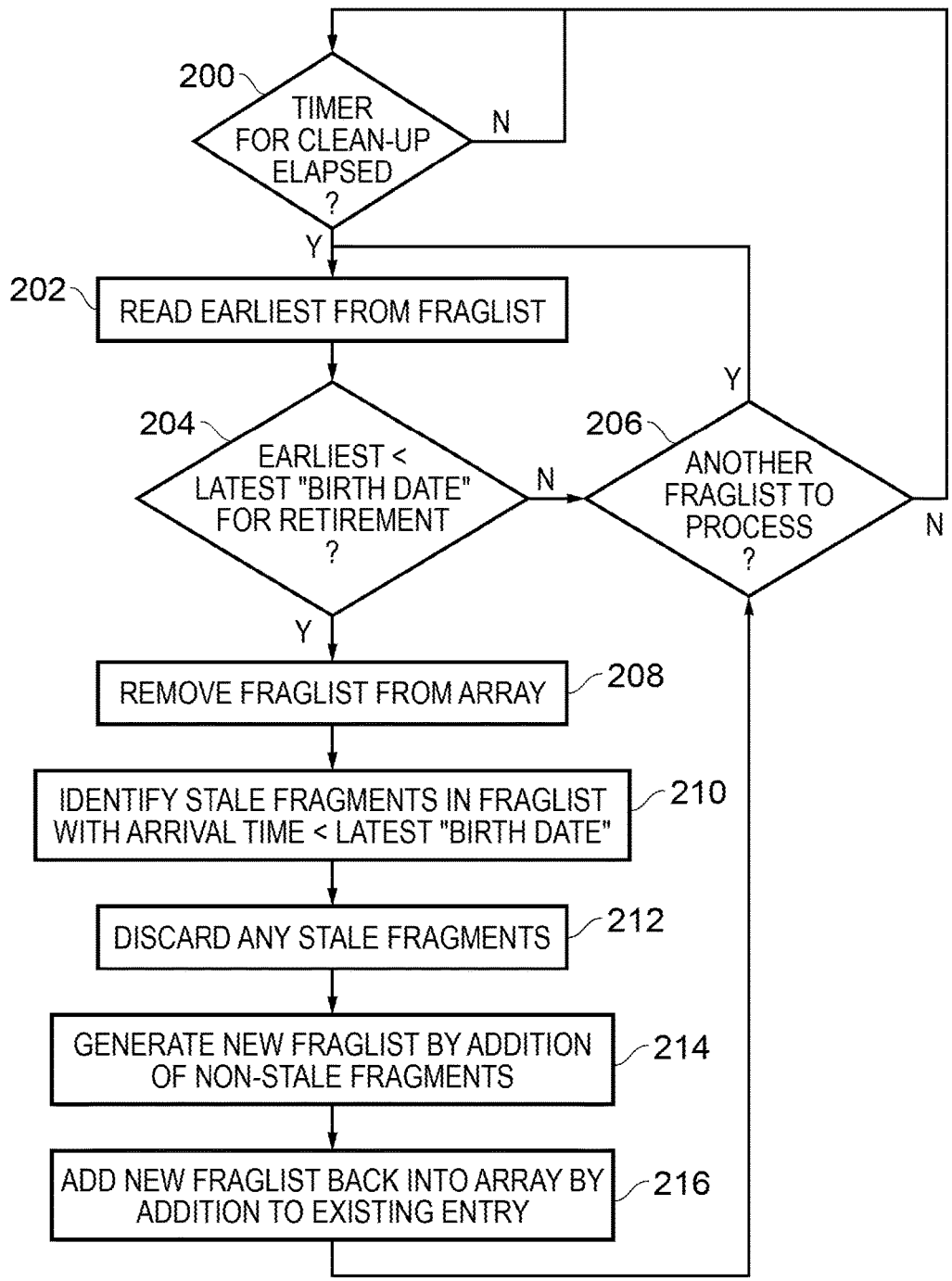
FIG. 8 shows a sequence of steps which are taken in the method of one embodiment to remove stale fragments from the fragment list entries in a fragment list array in one embodiment.

Finally FIG. 8 shows a sequence of steps which are taken in one embodiment in order to discard any fragments which are determined to have been received too long ago, and therefore are deemed to be unlikely to be successfully reassembled into a complete datagram. Not only does this in save storage space, but is also necessary in some situations, such as when IP IDs are recycled. For example in the case of IPv4, IP ID is only 16 bits, and will therefore wrap around in a few milliseconds on a 10 or 100 Gbps link. Thus there is a need to discard old fragments before the IP ID wraps around or otherwise an invalid reassembly could be performed using fragments from different iterations of use of the IP ID. The flow can be considered to start at step 200 where the flow waits until a timer provided for the purpose of provoking this periodic clean-up elapses. This could for example be the timer 26 shown as part of the fragment processing circuitry 24 in FIG. 1B. At step 202 a first fraglist in the fraglist table is considered and its earliest value is read. It is then determined at step 204 if this timestamp is less than the latest "birth date" for which retirement of fragments is required. This "birth date" can for example be defined by the use of the "max age" value 28 held in the fragment processing circuitry 24 in FIG. 1B. Since the timestamps used for the earliest values are absolute (although ultimately they may roll over), the fragment processing circuitry therefore determines the "latest birth date" value as a correspondingly defined absolute value, which must therefore be updated at each iteration such that the required "max age" is applied to each earliest timestamp considered.

If it is determined at step 204 that the earliest timestamp of the fraglist entry indicates that none of the fragments corresponding to this fraglist has yet reached this "max age", then the flow proceeds to step 206 where it is determined if, at this iteration of the clean-up process, there remains another fraglist in the fraglist table to be considered. If there is not then the flow returns to step 202 to wait for the clean-up timer to elapse again. Conversely if there is then the flow returns to step 202 for that further fraglist to be considered. If a fraglist under consideration is determined to have an earliest timestamp indicating that at least one of the fragments corresponding to this fraglist has indeed reached this "max age", then the flow proceeds to step 208 where this fraglist entry is removed from the array (and is replaced by the null fraglist element). This ensures that the clean-up processing of this fraglist to be performed "in private" by the processing element performing this processing, and allowing other processing elements accessing the array to do so in a lock-free manner. Then at step 210 any stale fragments in the fraglist are identified as those which have an arrival time timestamp which is less than the above-mentioned calculated latest allowed "birth date". Any such stale fragments which are identified are discarded at step 212 and subsequently at step 214 a new fraglist is generated by addition of the remaining non-stale fragments. Finally at step 216 this newly generated fraglist is written back into the array (fraglist table) by addition to the existing relevant entry. Note that the relevant array slot might have been updated with at least one newly arriving fragment in the interim, so it is not possible to simply overwrite this entry.

In brief overall summary an apparatus and a corresponding method for processing received datagram fragments are provided. Fragments are considered in fragments lists, which comprise a linked list of fragments. The fragments lists are referenced by corresponding entries stored in fragment list storage, where all received fragments from a given datagram will form part of the same fragment list, but a given fragment list can comprise fragments from multiple datagrams. An accumulated size of the payloads for a linked list of fragments is maintained and allows a determination to be made of whether it appears that sufficient fragments have been received that reassembly of a datagram may be possible. Access to a selected fragment list entry is made atomically, wherein the existing entry is first read and then if a datagram reassembly is to be attempted a write access sets the selected fragment list entry to a null entry before that datagram reassembly is attempted. If no reassembly is to be attempted the write access comprises updating the selected fragment list entry to include the received fragment in the linked list of fragments. A lock-free mechanism for access to the fragment list storage is thus provided and contention between parallel accesses is nonetheless limited, promoting the scaling of fragment reception processing to multiple parallel processes.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. An apparatus comprising:
reception circuitry to receive a datagram, wherein the datagram is received subdivided into multiple fragments;
fragment list storage circuitry to store fragment list entries, wherein a fragment list entry comprises a pointer to a linked list of fragments and an accumulated sire for the linked list of fragments; and
fragment processing circuitry to perform an atomic access to a selected fragment list entry in response to reception of a fragment, wherein the selected fragment list entry is selected in dependence on at least one datagram identifier in the fragment, wherein the atomic access comprises a read access followed by a write access, and to calculate an updated accumulated size as the accumulated size plus a size of the fragment,
wherein the fragment processing circuitry is responsive to completion of the read access to perform the write access to the selected fragment list entry,
wherein, when the selected fragment list entry comprises a size of the datagram and the updated accumulated size is at least equal to the size of the datagram, the write access comprises setting the selected fragment list entry to a null entry and when the write access is complete the fragment processing circuitry attempting a datagram reassembly process on the fragment and the fragments indicated by the linked list of fragments pointed to by the pointer of the selected fragment list entry,
and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

2. The apparatus as claimed in claim 1, wherein when the selected fragment list entry comprises the size of the datagram and the selected fragment list entry comprises a last fragment in the datagram, the size of the datagram is set in the selected fragment list entry as an offset of the last fragment into the datagram plus a length of the last fragment, and when the selected fragment list entry does not comprise the size of the datagram, the size of the datagram is set in the selected fragment list entry as a predetermined value which is at least a maximum possible size for the datagram.

3. The apparatus as claimed in claim 1, wherein the fragment processing circuitry is responsive to completion of the read access to perform a fragment list addition process prior to the write access to construct a combined fragment list from the fragment and the selected fragment list entry read by the read access, and wherein updating the selected fragment list entry to include the fragment in the linked list of fragments comprises writing a revised pointer to the combined fragment list.

4. The apparatus as claimed in claim 3, wherein updating the selected fragment list entry to include the fragment in the linked list of fragments comprises writing the updated accumulated size in the selected fragment list entry.

5. The apparatus as claimed in claim 1. wherein the fragment processing circuitry is responsive to completion of the read access to perform a fragment list addition process prior to the write access to construct a combined fragment list from the fragment and the selected fragment list entry read by the read access, wherein the fragment list addition process comprises a saturating addition to generate the updated accumulated size, wherein the saturating addition saturates at a predetermined value which is at least a maximum possible size for the datagram.

6. The apparatus as claimed in claim 2, wherein the fragment processing circuitry is responsive to completion of the read access to perform a fragment list addition process prior to the write access to construct a combined fragment list from the fragment and the selected fragment list entry read by the read access, wherein the fragment list addition process comprises a minimum comparison to generate the size of the datagram for the combined fragment list as a smaller value of the size of the datagram in the fragment and the size of the datagram in the selected fragment list entry.

7. The apparatus as claimed in claim 1, wherein the fragment processing circuitry is responsive to completion of the read access to perform a fragment list addition process prior to the write access to construct a combined fragment list from the fragment and the selected fragment list entry read by the read access, wherein the fragment list addition process comprises constructing a pointer to a last fragment in a first-ordered operand specified for the fragment list addition, wherein constructing the pointer is performed before commencing the read access.

8. The apparatus as claimed in claim 7, wherein the fragment list addition process comprises setting a further pointer in the last fragment in the first-ordered operand to indicate a first fragment in a second-ordered operand specified for the fragment list addition.

9. The apparatus as claimed in claim 1, wherein the datagram reassembly process further comprises a further write access to the selected fragment list entry to update the selected fragment list entry to comprise a revised pointer to an addition result of the selected fragment list entry and a remainder linked list of fragments which the datagram reassembly process has not reassembled into a complete datagram.

10. The apparatus as claimed in claim 1, wherein the fragment list storage circuitry is arranged to store the fragment list entries in a hash table, wherein an index into the hash table indicating the selected fragment list entry is generated as a bash of the at least one datagram identifier in the fragment.

11. The apparatus as claimed in claim 1, wherein memory space for the fragment list entries is statically allocated in the fragment list storage circuitry.

12. The apparatus as claimed in claim 1, wherein the fragment list entry comprises an earliest arrival time value which indicates an arrival time of an earliest arriving fragment in the linked list of fragments, and the fragment processing circuitry is arranged to periodically examine the earliest arrival time value of each of the fragment list entries stored in the fragment list storage circuitry and, when the earliest arrival time value is older than an earliest allowed arrival time value, to examine the fragments in the linked list of fragments, to discard any stale fragments which have the arrival time value which is older than the earliest allowed arrival time value, and to update the pointer in the fragment list entry to point to a revised linked list of remaining non-stale fragments.

13. The apparatus as claimed in claim 12, wherein generation of the revised linked list of remaining no stale fragments comprises an addition operation on the remaining non-stale fragments.

14. The apparatus as claimed in claim 12, wherein the fragment processing circuitry is responsive to the earliest arrival time value being older than the earliest allowed arrival time value to remove the fragment list entry from the fragment list storage circuitry before examining the fragments in the linked list of fragments, and after discarding any stale fragments which have the arrival time value which is older than the earliest allowed arrival time value to add the revised linked list of remaining non-stale fragments to the fragment list entry in the fragment list storage circuitry.

15. The apparatus as claimed in claim 1, wherein the fragment list entry has a size for which the fragment processing circuitry is configured to perform the read access in a single memory access operation and for which the fragment processing circuitry is configured to perform the write access in a single memory access operation.

16. The apparatus as claimed in claim 1, wherein the fragment processing circuitry is configured to execute multiple execution threads, wherein each execution thread of the multiple execution threads independently handles an allocated fragment of the multiple fragments.

17. The apparatus as claimed in claim 1, wherein the apparatus comprise multiple fragment processing circuitries, wherein each fragment processing circuitry of the multiple fragment processing circuitries independently handles an allocated fragment of the multiple fragments.

18. The apparatus as claimed in claim 17, further comprising:
a private data store associated with each fragment processing circuitry; and
a shared data store shared by the multiple fragment processing circuitries,
and each fragment processing circuitry is responsive to presence in its private data store of a copy of the selected fragment list entry, and when another fragment processing circuitry seeks access to the selected fragment list entry, to cause the copy of the selected fragment list entry to be sent to the shared data store, and to cause the atomic access to be exported to and carried out on the shared data store.

19. A method of processing a datagram received subdivided into multiple fragments, the method performed by at least one processor and comprising the steps of:
storing fragment list entries, wherein a fragment list entry comprises a pointer to a linked list of fragments and an accumulated size for the linked list of fragments;
performing an atomic access to selected fragment list entry in response to reception of a fragment, wherein the selected fragment list entry is selected in dependence on at least one datagram identifier in the fragment, wherein the atomic access comprises a read access followed by a write access;
calculating an updated accumulated size as the accumulated size plus a size of the fragment; and
on completion of the read access, performing the write access to the selected fragment list entry,
wherein, when the selected fragment list entry comprises a size of the datagram and the updated accumulated size is at least equal to the size of the datagram, the write access comprises setting the selected fragment list entry to a null entry and, when the write access is complete, attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the datagram, the write access comprises updating the selected fragment list entry to include the fragment in the linked list of fragments and with the updated accumulated size and the datagram reassembly process is not attempted until at least a further fragment has been received for which the selected fragment list entry is selected.

20. An apparatus comprising:

means for receiving a datagram, wherein the datagram is received subdivided into multiple fragments;

means for storing fragment list entries, wherein a fragment list entry comprises a pointer to a linked list of fragments and an accumulated size for the linked list of fragments;

means for processing fragments to perform an atomic access to a selected fragment list entry in response to reception of a fragment, wherein the selected fragment list entry is selected in dependence on at least one datagram identifier in the fragment, wherein the atomic access comprises a read access followed by a write access; and means for calculating an updated accumulated size as the accumulated size plus a size of the fragment, wherein the means for processing fragments is responsive to completion of the read access to perform the write access to the selected fragment list entry, wherein, when the selected fragment list entry comprises a size of the datagram and the updated accumulated size is at least equal to the size of the datagram, the write access comprises setting the selected fragment list entry to a null entry and when the write access is complete the means for processing fragments attempting a datagram reassembly process on the fragment and the fragments indicated by the linked list of fragments pointed to by the pointer of the selected fragment list entry, and wherein, when the updated accumulated size is less than the size of the datagram or the selected fragment list entry does not comprise the size of the data, the write access comprises updating the selected fragment list entry to include the fragment in the linked list of fragments and with the updated accumulated size and the datagram reassembly process is not attempted until at least a further fragment has been received for which the selected fragment list entry is selected.

* * * * *